United States Patent
Chan et al.

(10) Patent No.: US 10,409,027 B2
(45) Date of Patent: Sep. 10, 2019

(54) ELECTROMAGNETIC DRIVING MODULE HAVING RESONANCE INHIBITING ELEMENT AND ELECTRONIC DEVICE USING THE SAME

(71) Applicant: TDK TAIWAN CORP., Taoyuan (TW)

(72) Inventors: Yi Liang Chan, Taoyuan (TW); Yusheng Li, Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 206 days.

(21) Appl. No.: 15/167,081

(22) Filed: May 27, 2016

(65) Prior Publication Data
US 2017/0031131 A1 Feb. 2, 2017

(30) Foreign Application Priority Data
Jul. 30, 2015 (TW) .............. 104212245 U

(51) Int. Cl.
| | |
|---|---|
| G01D 5/14 | (2006.01) |
| G01J 1/04 | (2006.01) |
| G02B 7/10 | (2006.01) |
| G02B 27/64 | (2006.01) |
| H04N 5/232 | (2006.01) |

(52) U.S. Cl.
CPC .............. G02B 7/102 (2013.01); G01D 5/145 (2013.01); G02B 27/646 (2013.01); H04N 5/23287 (2013.01); G03B 2205/0007 (2013.01)

(58) Field of Classification Search
CPC ........ G01D 5/142; G01D 5/145; G01D 5/147; G01J 1/0411; G01J 1/0448; G02B 7/09; G02B 7/10; G02B 7/102; G02B 15/14; G02B 23/16; G02B 27/64; G02B 27/646; G03B 2205/0007; G03B 2205/0015; G03B 2205/0023; G03B 2205/0038; G11B 7/0925; G11B 7/0927; H04N 5/2253; H04N 5/2254; H04N 5/23248; H04N 5/23258; H04N 5/23264; H04N 5/2328; H04N 5/23287
USPC ..... 348/208.99, 208.2, 208.4, 208.7, 208.11; 359/554, 557, 703, 704, 819, 823, 824; 396/52, 53, 55
See application file for complete search history.

(56) References Cited

U.S. PATENT DOCUMENTS

| | | | |
|---|---|---|---|
| 8,849,106 B1 * | 9/2014 | Kokichi | H04N 5/2328 396/55 |
| 2007/0242938 A1 * | 10/2007 | Uno | G02B 27/646 396/55 |
| 2016/0301875 A1 * | 10/2016 | Iwasaki | G02B 7/09 |

* cited by examiner

Primary Examiner — Stephone B Allen
Assistant Examiner — Ryan S Dunning
(74) Attorney, Agent, or Firm — Muncy, Geissler, Olds & Lowe, P.C

(57) ABSTRACT

A driving assembly is provided. The driving assembly includes a fixed member, a movable member, a driving magnet unit, a coil, and a focusing magnetic element. The movable member is arranged to be movable relative to the fixed member in a main axis via a magnetic force generated by the coil and the driving magnet unit. Additionally, the resonance of the movable member is inhibited by a magnetic force generated by the focusing magnetic element and the driving magnet unit.

12 Claims, 5 Drawing Sheets

ELECTROMAGNETIC DRIVING MODULE HAVING RESONANCE INHIBITING ELEMENT AND ELECTRONIC DEVICE USING THE SAME

CROSS REFERENCE TO RELATED APPLICATIONS

This application claims priority of Taiwan Patent Application No. 104212245, filed on Jul. 30, 2015, the entirety of which is incorporated by reference herein.

BACKGROUND

Field of the Invention

The present invention relates to a driving module and an electronic device using the same, and more particularly to an electromagnetic driving module which converts electrical energy into mechanical energy and an electronic device using the same.

Description of the Related Art

Generally, an electronic device includes a driving module to drive an element to move a predetermined distance. For example, an electronic device having an image-capturing function usually includes a driving module to generate driving power. One or more optical lens units of the electronic device are driven by the driving power to move along an optical axis, so as to facilitate auto-focus and auto-zoom controls.

However, since the driving module includes a complex driving member, such as a stepper motor, ultrasonic motor, piezoelectric actuator, etc. to generate the driving power and the driving power has to be transmitted by a number of transmission elements, it is not easy to assemble and the manufacturing cost is high. In addition, a conventional driving module is also large in size and has a high power consumption due to its complex construction.

Therefore, a driving module that has the advantages of small size and simple construction is desired by the manufacturers.

SUMMARY

Accordingly, one objective of the present invention is to provide a driving assembly, which is configured to provide a driving force to drive an element such as a lens assembly positioned in an electronic device to move.

In accordance with some embodiments of the disclosure, the driving assembly includes a fixed member, a movable member, a driving magnet unit, a coil, and a focusing magnetic element. The movable member is arranged to be movable relative to the fixed member in a main axis via a magnetic force generated by the coil and the driving magnet unit. The resonance of the movable member is inhibited by a magnetic force generated by the focusing magnetic element and the driving magnet unit.

In the above-mentioned embodiments, the driving magnet unit is positioned at the fixed member, and the coil and the focusing magnetic element are arranged to correspond to the driving magnet unit and are positioned at the movable member. Alternatively, the driving magnet unit is positioned at the movable member, and the coil and the focusing magnetic element are arranged to correspond to the driving magnet unit and are positioned at the fixed member.

In the above-mentioned embodiments, the driving magnet unit is arranged to correspond to the focusing magnetic element in a lateral direction of the movable member.

In the above-mentioned embodiments, the coil is arranged to be offset from the focusing magnetic element in a direction perpendicular to the main axis.

In the above-mentioned embodiments, the driving magnet unit includes a first driving magnet and a second driving magnet. The first driving magnet is arranged to correspond to the coil in a first direction. The second driving magnet is arranged to correspond to the coil in a second direction which is different from the first direction.

In the above-mentioned embodiments, the driving assembly further includes a positioning magnet and a hall sensor. The positioning magnet, the coil, and the focusing magnetic element are positioned at the movable member. The hall sensor and the driving magnet unit are positioned at the fixed member, and the positioning magnet is arranged to correspond to the hall sensor. In some embodiments, the driving assembly further includes another focusing magnetic element and another positioning magnet. The two focusing magnetic elements are diagonally positioned at the movable member, and the two positioning magnets are diagonally positioned at the movable member.

Another objective of the disclosure is to provide an electronic device including the driving assembly in any one of the above-mentioned embodiments. The electronic device further includes a lens assembly positioned on the movable member of the driving assembly and an optical sensor configured to receive light that passes through the lens assembly. The focal length between the lens assembly and the optical sensor is adjusted by the driving assembly so as to facilitate an auto-focus and an auto-zoom control.

The other objective of the disclosure is to provide an electromagnetic driving module including the driving assembly in any one of the above-mentioned embodiments. The electromagnetic driving module further includes a base assembly, an OIS driving magnet, an OIS driving coil, and an OIS magnetic element. The movable member of the driving assembly is driven to move in a direction perpendicular to the main axis by a magnetic force generated by the OIS driving coil and the OIS driving magnet. The resonance of the driving assembly is inhibited by a magnetic force generated by the OIS magnetic element and the OIS driving magnet unit.

BRIEF DESCRIPTION OF THE DRAWINGS

For a more complete understanding of the embodiments and the advantages thereof, reference is now made to the following descriptions taken in conjunction with the accompanying drawings.

DESCRIPTION OF THE ILLUSTRATIVE EMBODIMENTS

Figure 1:
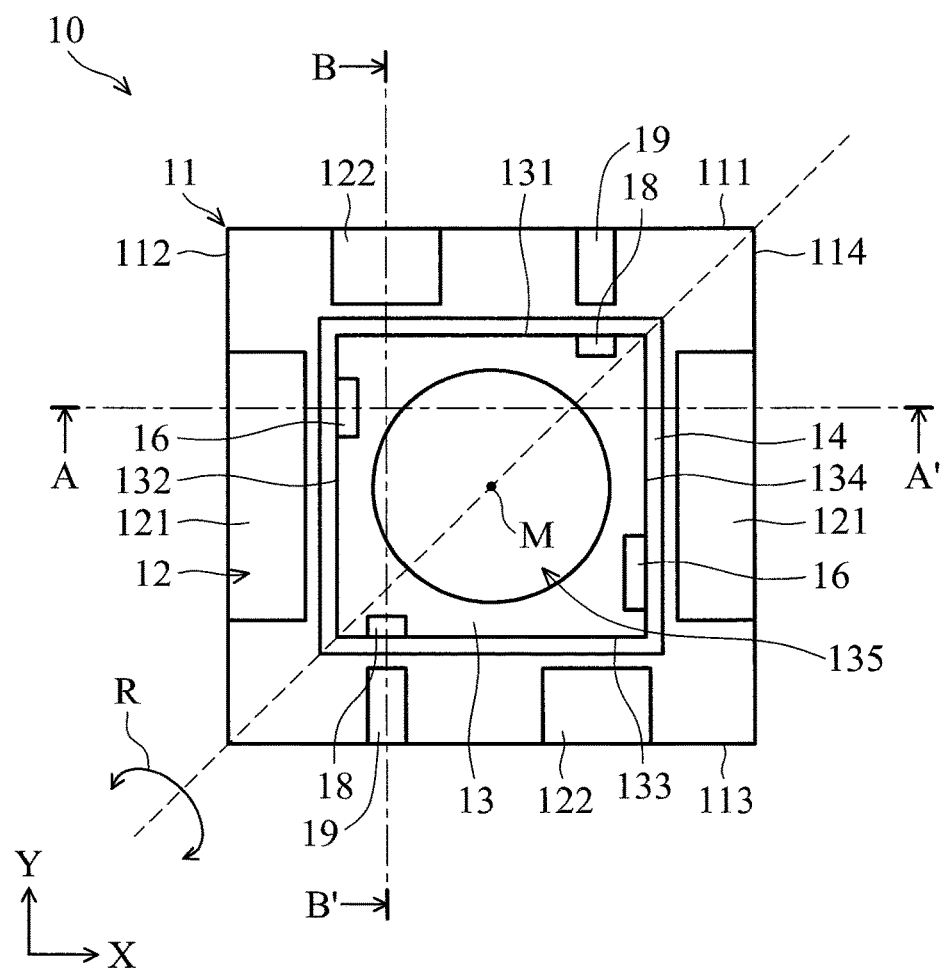
FIG. 1 shows a schematic view of a driving assembly, in accordance with a first embodiment of the disclosure.

In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate not only that the layer directly contacts the other layer, but also that the layer does not directly contact the other layer, there being one or more intermediate layers disposed between the layer and the other layer.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
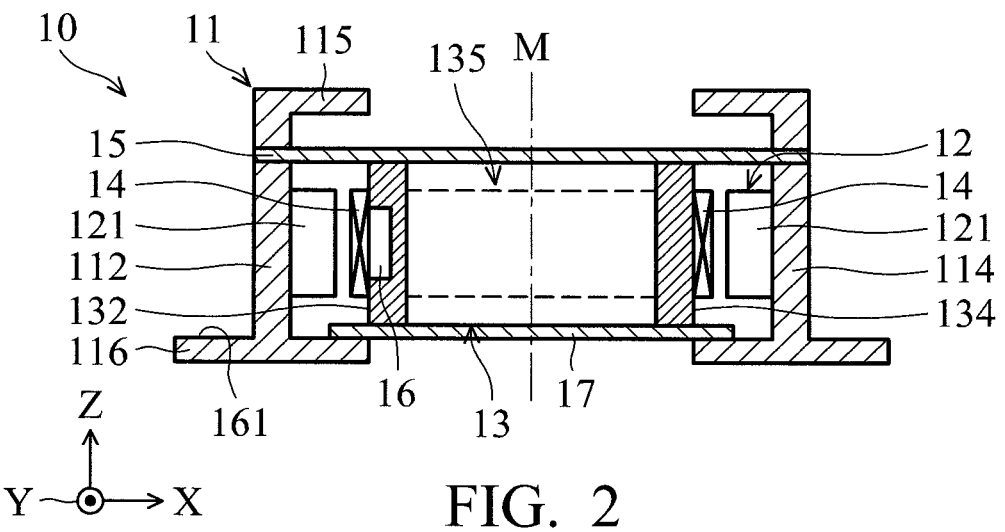
FIG. 2 shows a cross-sectional view taken along line A-A' of FIG. 1.
Figure 3:
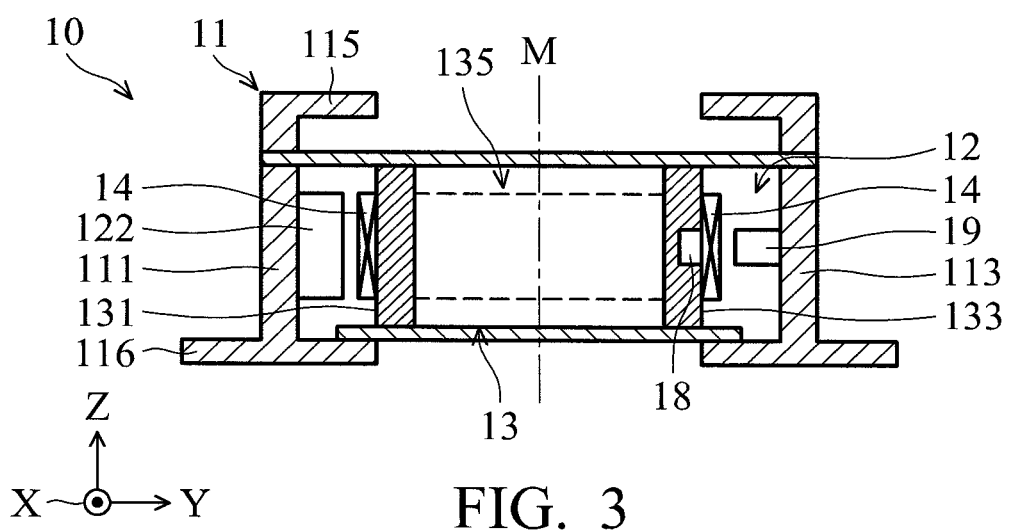
FIG. 3 shows a cross-sectional view taken along line B-B' of FIG. 1.

FIG. 1 shows a schematic plane view of a driving assembly 10, FIG. 2 shows a cross-sectional view taken along line A-A' of FIG. 1, and FIG. 3 shows a cross-sectional view taken along line B-B' of FIG. 1. In the embodiment, the driving assembly 10 is a voice coil actuator (VCA) and includes a fixed member 11, a driving magnet unit 12, a movable member 13, a coil 14, an upper elastic sheet 15 (FIG. 2), two focusing magnetic elements 16, a lower elastic sheet 17 (FIG. 2), two positioning magnets 18, and two hall sensors 19. The elements of the driving assembly 10 can be added to or omitted, and the invention should not be limited by the embodiment.

In the embodiment, the fixed member 11 includes an upper housing member 115 (FIG. 2), a lower housing member 116 (FIG. 2), and one or more lateral housing members. The upper housing member 115 and the lower housing member 116 are arranged along a main axis M and face one another. The one or more lateral housing members extend from the upper housing member 115 toward the lower housing member 116. For example, as shown in FIG. 1, the fixed member 11 includes a number of lateral housing members 111, 112, 113, and 114, each extends from the upper housing member 115 toward the lower housing member 116. The lateral housing members 111 and 113 face one another, and the lateral housing members 112 and 114 face one another. The lateral housing members 111, 112, 113, and 114 can be made individually and assembled together by a suitable method. Alternatively, the lateral housing members 111, 112, 113, and 114 are made integrally. In some non-illustrated embodiments, the fixed member 11 includes a cylindrical lateral housing member.

In the embodiment, as shown in FIG. 2, each of the upper housing member 115 and the lower housing member 116 defines an opening, and the openings are aligned to the main axis M. In addition, the lower housing member 116 includes an extension portion 161 extends outwardly.

In the embodiment, the driving magnet unit 12 includes two first driving magnets 121, and two second driving magnets 122. The two first driving magnets 121 are respectively positioned at the two lateral housing members 112 and 114, and the two second driving magnets 122 are respectively positioned at the two lateral housing members 111 and 113. As shown in FIG. 2, the two second driving magnets 122 are diagonally positioned at the fixed member 11.

The two first driving magnets 121 may be the same as the two second driving magnets 122. Alternatively, the two first driving magnets 121 may be different from the two second driving magnets 122. For example, the magnetic field of each first driving magnet 121 may be greater or less than that of each second driving magnet 122. In some embodiments, the fixed member 11 is made of magnetic attraction material, and the driving magnet unit 12 is directly attached on the inner surface of the lateral housing member of the fixed member 11.

However, it should be appreciated that the arrangement of the first and the second driving magnets 121 and 122 should not be limited to the embodiment. The position of the first and the second driving magnets 121 and 122 may be changed as long as the movable member 13 can be stably driven to move by the magnetic force generated by the first and the second driving magnets 121 and 122. In some non-illustration embodiments, the two second driving magnets 122 are omitted.

In the embodiment, the movable member 13 has a channel 135 penetrating the movable member 13 along the main axis M, and the channel 135 is configured to support one element, such as lens assembly (not shown in FIG. 1). In some embodiments, the movable member 13 includes one or more side surfaces circumferentially arranged around the channel 135. For example, as shown in FIG. 1, the movable member 13 includes a number of side surfaces, such as the first side surface 131, the second side surface 132, the third side surface 133, and the fourth side surface 134.

The first and the third side surfaces 131 and 133 face one another, and the second and the fourth side surfaces 132 and 134 face one another. In the embodiment, the first side surface 131 faces the lateral housing member 111, and the second side surface 132 faces the lateral housing member 112, and the third side surface 133 faces the lateral housing member 113, and the fourth side surface 134 faces the lateral housing member 114. However, it should be appreciated that the configuration of the movable member 13 should not be limited to the above embodiment. In some non-illustration embodiments, the movable member 13 includes a cylindrical outer surface.

As shown in FIG. 1, each of the first and the third side surfaces 131 and 133 includes a recess for receiving one of the two positioning magnets 18, wherein the two recesses are diagonally arranged at the movable member 13. In addition, each of the second and the fourth side surfaces 132 and 134 includes a recess for receiving one of the two focusing magnetic elements 16, wherein the two recesses are diagonally arranged at the movable member 13.

In the embodiment, the coil 14 surrounds the side surface of the movable member 13. The coil 14 is arranged to correspond to the two first driving magnets 121 in a first direction that is perpendicular to the main axis M (i.e., parallel to the X-axis). In addition, the coil 14 is arranged to correspond to the two second driving magnets 122 in a second direction that is perpendicular to the main axis M (i.e., parallel to Y-axis). When an electronic current passes through the coil 14, the movable member 13 is driven to move in a direction parallel to the main axis M (i.e., parallel to Z-axis) by the magnetic force generated by the coil 14 and the driving magnet unit 12.

In the embodiment, the two focusing magnetic elements 16 are respectively positioned in the two recesses formed at the second and the fourth side surfaces 132 and 134. As a result, one of the two focusing magnetic elements 16 is positioned at the second side surface 132 and is arranged to be adjacent to the first side surface 131. In addition, the other one of focusing magnetic elements 16 is positioned at the fourth side surface 134 and is arranged to be adjacent to the third side surface 133. That is the two focusing magnetic elements 16 are diagonally positioned at the movable member 13.

Additionally, the two focusing magnetic elements 16 are arranged to correspond to the two first driving magnets 121 in a first direction that is perpendicular to the main axis M (i.e., parallel to X-axis). In the embodiment, the two focusing magnetic elements 16 are farther away from the first driving magnet 121 than the coil 14, and the two focusing magnetic elements 16 are covered by the coil 14. Each of the two focusing magnetic elements 16 may be made of magnetic metal such as iron, nickel, cadmium, cobalt, cadmium, or any other material that can be attracted by the magnetic field generated by the corresponding second driving magnet 122.

Referring to FIG. 2, the upper elastic sheet 15 and lower elastic sheet 17 are configured for supporting the movable member 13 and enabling the movable member 13 to move in a direction parallel to the main axis M (i.e., parallel to Z-axis) within the fixed member 11. In some embodiments, the upper elastic sheet 15 is fixed at a vicinity of the upper housing member 115, and the lower elastic sheet 17 is fixed at a vicinity of the lower housing member 116.

In the embodiment, as shown in FIG. 1, one of the two hall sensors 19 is positioned at the lateral housing member 111 and is arranged to be adjacent to the lateral housing members 112. The other one of the hall sensors 19 is positioned at the lateral housing member 113 and is arranged to be adjacent to the lateral housing members 114. That is the two hall sensors 19 are diagonally positioned at the fixed member 11. The two positioning magnets 18 are arranged to correspond to the two hall sensors 19 in a direction that is perpendicular to the main axis M. By detecting the positioning magnets 18, the hall sensors 19 produces an electrical signal based on the position of the positioning magnets 18, so that the position of the movable member 13 is measured.

In the embodiment, a mechanical resonance may occur in a direction R as indicated by the arrow shown in FIG. 1 while the movable member 13 is moving. However, the two focusing magnetic elements 16, that are positioned on the movable member 13, are attracted the magnetic field generated by the two first driving magnets 121, so that the resonance of the movable member 13 is inhibited. Additionally, since the resonance of the movable member 13 is constrained, the signal accuracy of the hall sensor 19 is improved.

With the above-mentioned arrangements, in the operation of the driving assembly 10, the movable member 13 is stably driven to move in the direction parallel to the main axis M (i.e., parallel to Z-axis) by the magnetic force generated by the coil 14, the two first driving magnets 121, and the two second driving magnets 122. As a result, the control accuracy of the movable member 13 is improved. Additionally, during the movement of the movable member 13, the two focusing magnetic elements 16 is always attracted by the magnetic field generated by the two first driving magnets 121, so that the mechanical resonance of the movable member 13 which tends to occur during the movement of the movable member 13 is inhibited.

Figure 4:
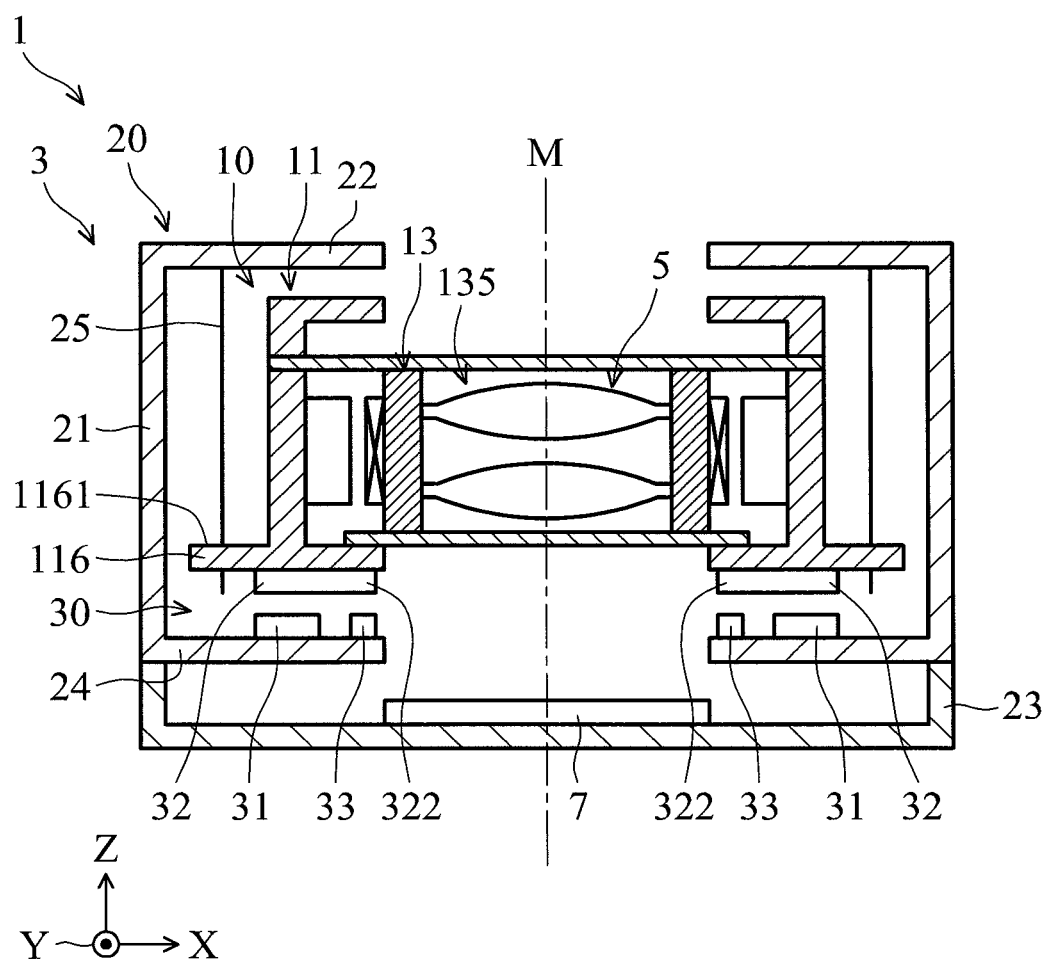
FIG. 4 shows a schematic view of an electronic device, in accordance with one embodiment.

FIG. 4 shows a cross-sectional schematic view of the electronic device 1. In some embodiments, the electronic device 1, for example is a camera device, includes an electromagnetic driving module 3, a lens assembly 5, and an optical sensor 7. The electromagnetic driving module 3 is configured to adjust the focal length between the lens assembly 5 and the optical sensor 7, so as to facilitate an auto-focus and an auto-zoom control.

In the embodiment, the electromagnetic driving module 3 includes the driving assembly 10, a base assembly 20, two OIS (optical imaging stabilizer) driving coils 31, two OIS driving magnets 32, and two OIS magnetic elements 33. The elements of the electromagnetic driving module 3 can be added to or omitted, and the invention should not be limited by the embodiment.

The base assembly 20 includes a lateral frame member 21, an upper frame member 22, a lower frame member 23, and a fringe 24. The upper frame member 22 defines an opening that aligns with the main axis M. The lateral frame member 21 extends from the upper frame member 22 toward the lower frame member 23. The fringe 24 extends inwardly from the lateral frame member 21 and defines an opening that aligns with the main axis M. The driving assembly 10 aligns the main axis M and is positioned in a space defined by the lateral frame member 21, the upper frame member 22, and the fringe 24, wherein a protrusion 1161 of the driving assembly 10 is connected to the upper frame member 22 via a connecting line 25, and therefore the driving assembly 10 is suspended in the base assembly 20. The lens assembly 5 is positioned in the channel 135 of the driving assembly 10, and the optical axis of the lens assembly 5 aligns with the main axis M. The optical sensor 7 aligns with the main axis M and positioned at the lower frame member 23. The optical sensor 7 is a CMOS sensor, for example. The optical sensor 7 receives light passing through the lens assembly 5 and produces an image signal.

In the embodiment, the two OIS driving magnets 32 are positioned separately at the bottom surface of the lower housing member 116 of the driving assembly 10. The two OIS driving coils 31 are positioned at the fringe 24 and respectively arranged to correspond to the two OIS driving magnets 32. When an electronic current passes through the two OIS driving coils 31, the driving assembly 10 is driven to move relative to the base assembly 20 in a direction perpendicular to the main axis M by the magnetic force generated by the driving assembly 10 and the driving magnet unit 12. The two OIS magnetic elements 33 are positioned at the fringe 24 and respectively arranged to correspond to the two OIS driving magnets 32. The two OIS magnetic elements 33 may be made of magnetic metal such as iron, nickel, cadmium, cobalt, cadmium, or any other material that can be attracted by the magnetic field generated by the corresponding OIS driving magnet 32. As viewed from top side, each of the OIS driving coils 31 is arranged to be offset from the neighboring OIS magnetic element 33. As a whole, the OIS driving coil 31 and the OIS magnetic element 33 which face the same OIS driving magnet 32 do not overlap one another as viewed from a direction parallel to the main axis M.

With the above-mentioned arrangements, in the operation of the electronic device 1, the position of the lens assembly 5 relative to the optical sensor 7 in a direction parallel to the main axis M (i.e., parallel to Z-axis) is adjustable, so as to facilitate an auto-focus and an auto-zoom control. In addition, the magnetic force generated by the two OIS driving coils 31 and the two OIS driving magnets 32 also improves the image quality of the electronic device 1 as a shock occurs. Moreover, the two OIS magnetic element 33 is always attracted by the magnetic field generated by the two OIS driving magnets 32, so that the mechanical resonance of the driving assembly 10 which tends to occur during the movement of the driving assembly 10 is inhibited.

It should be appreciated that, in the above-mentioned embodiments, while the OIS driving coil 31 and the OIS magnetic element 33 which are arranged next to one another are attracted or repelled by the magnetic field generated by the same OIS driving magnet 32, the embodiment should not be limited thereto. In some embodiments, the OIS driving coil 31 and the OIS magnetic element 33 which are arranged next to one another are respectively arranged to correspond to two magnets.

The configuration of the driving assembly 10 should not be limited to the above-mentioned embodiments. Examples of different driving assemblies 10 are described below.

Figure 5:
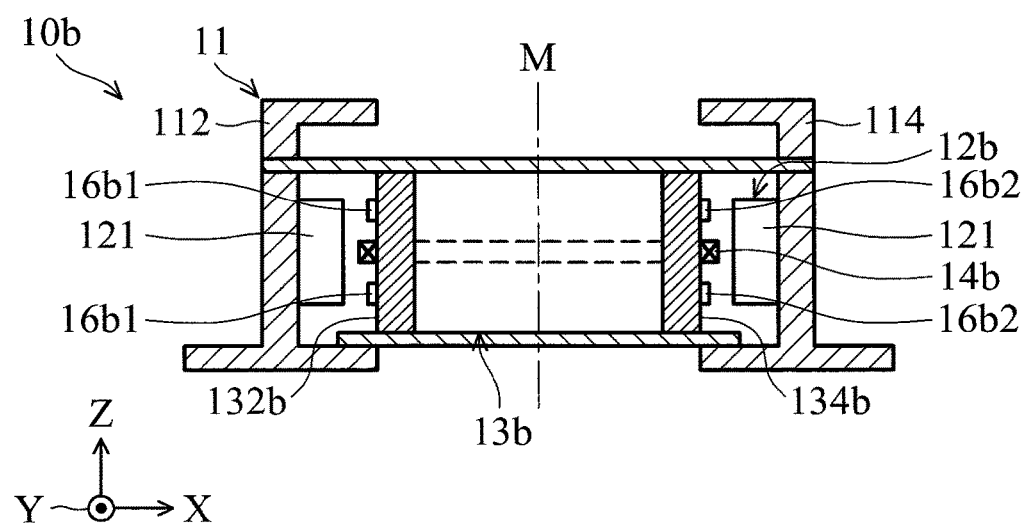
FIG. 5 shows a schematic view of a driving assembly, in accordance with a second embodiment of the disclosure.

FIG. 5 shows a cross-sectional schematic view of a driving assembly 10b in accordance with a second embodiment of the disclosure. In the embodiment, elements that are identical with or similar to the elements of the driving assembly 10 shown in FIGS. 2-3 are designated by the same reference number, and the features thereof are not repeated for the purpose of brevity. The difference between the driving assembly 10b and the driving assembly 10 includes the movable member 13 and the coil 14 of the driving assembly 10 being replaced by a movable member 13b and a coil 14b. In addition, the driving assembly 10b includes a number of focusing magnetic elements (such as two focusing magnetic elements 16b1 and two focusing magnetic elements 16b2). Unlike movable member 13 of FIG. 2, movable member 13b has no recess for receiving the focusing magnetic elements. The coil 14b surrounds the side surfaces of the movable member 13b. The coil 14b is arranged to correspond to one of the two first driving magnets 121 in a first direction that is perpendicular to the main axis M (i.e., parallel to the X-axis) and is arranged to correspond to the other first driving magnets 121 in a second direction that is perpendicular to the main axis M (i.e., parallel to the X-axis) and opposite to the first direction. The two focusing magnetic elements 16b1 are positioned at the second side surface 132b and is arranged to correspond to the two first driving magnets 121 in the first direction. The focusing magnetic elements 16b1 are respectively positioned at the upper side and the lower side of the coil 14.

In addition, the two focusing magnetic elements 16b2 are positioned at the fourth side surface 134b and is arranged to correspond the two first driving magnets 121 in the second direction. The two focusing magnetic elements 16b2 are respectively positioned at the upper side and the lower side of the coil 14. In the embodiment, as viewed from a direction perpendicular to the main axis M, the focusing magnetic elements 16b1 are offset from the coil 14, and the focusing magnetic elements 16b2 are also offset from the coil 14. In some non-illustration embodiments, the driving assembly 10b further includes additional focusing magnetic elements positioned at the first and/or the third side surfaces of the movable member 13b and arranged to correspond to the second driving magnets 122 (not shown in FIG. 5).

Figure 6:
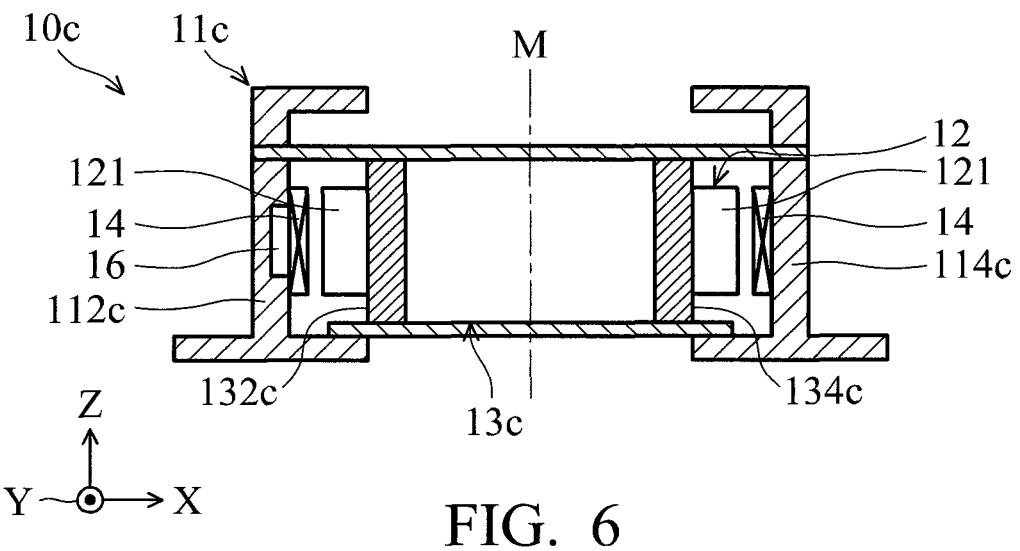
FIG. 6 shows a schematic view of a driving assembly, in accordance with a third embodiment of the disclosure.
Figure 7:
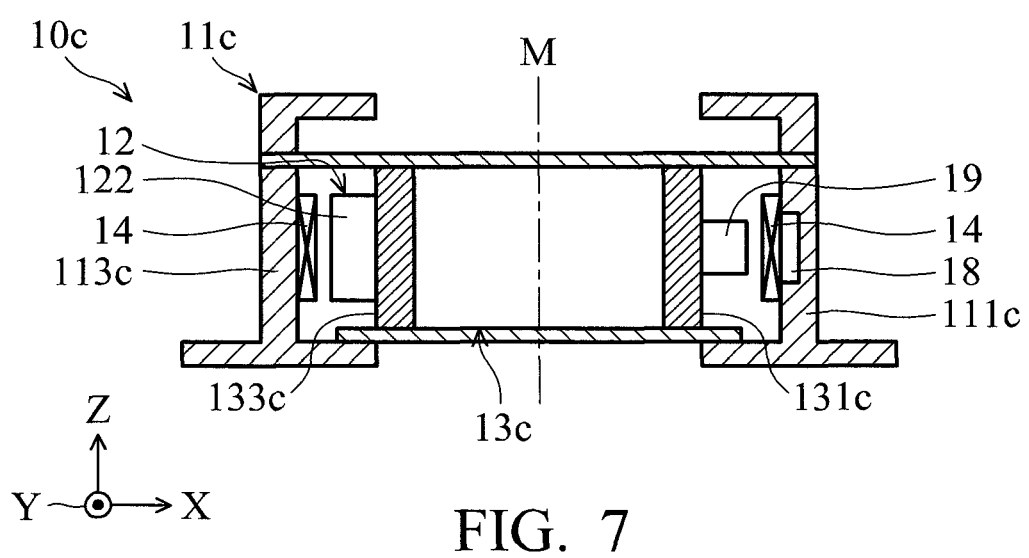
FIG. 7 shows a schematic view of a driving assembly, in accordance with a third embodiment of the disclosure.

FIGS. 6-7 show cross-sectional schematic views of a driving assembly 10c in accordance with a third embodiment of the disclosure. In the embodiment, elements that are identical with or similar to the elements of the driving assembly 10 shown in FIGS. 2-3 are designated by the same reference number, and the features thereof are not repeated for the purpose of brevity. The difference between the driving assembly 10c and the driving assembly 10 includes the fixed member 11 and the movable member 13 of the driving assembly 10 being replaced by a fixed member 11c movable member 13c. The fixed member 11c includes recesses for receiving the focusing magnetic elements 16 and the positioning magnets 18. In addition, unlike movable member 13 of FIG. 2, movable member 13c has no recess for receiving the focusing magnetic elements.

In the embodiment, the driving magnet unit 12 and the hall sensors 19 are positioned at the movable member 13c, and the coil 14 is positioned at the inner wall of the fixed member 11c. The two focusing magnetic elements 16 (only one focusing magnetic element 16 is shown in FIG. 7) are respectively positioned at two recesses formed on the lateral housing members 112c and 114c and arranged to correspond to the two first driving magnets 121. The two positioning magnets 18 (only one positioning magnet 18 is shown in FIG. 7) are respectively positioned at two recesses formed on the lateral housing members 111c and 113c and arranged to correspond to the two hall sensors 19.

Embodiments of the disclosure utilize magnetic force to constrain the mechanical resonance caused by the movement of the elements in the driving assembly. Compared with conventional driving assembly using glue material between two elements to reduce mechanical resonance, the driving assembly has advantage of cost-effective production and being easy to assemble.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A driving assembly, comprising:
   a fixed member;
   a movable member arranged to be movable in a main axis relative to the fixed member;
   a driving magnet unit, having a permanent magnet;
   a coil, wherein the movable member is driven to move in the main axis by a magnetic force generated by the coil and the driving magnet unit; and a focusing magnetic element, made of a magnetic material, not a permanent magnet, and corresponding to the driving magnet unit, wherein the resonance of the movable member is inhibited by a magnetic force generated by the focusing magnetic element and the driving magnet unit, wherein the driving magnet unit is positioned at the fixed member, and the coil and the focusing magnetic element are arranged to correspond to the driving magnet unit and are positioned at the movable member.

2. The driving assembly as claimed in claim 1, wherein the driving magnet unit is positioned at the movable member, and the coil and the focusing magnetic element are arranged to correspond to the driving magnet unit and are positioned at the fixed member.

3. The driving assembly as claimed in claim 1, wherein the driving magnet unit is arranged to correspond to the focusing magnetic element in a lateral direction of the movable member.

4. The driving assembly as claimed in claim 1, wherein the coil is arranged to be offset from the focusing magnetic element as viewed in a direction perpendicular to the main axis.

5. The driving assembly as claimed in claim 1, wherein the driving magnet unit comprises:
a first driving magnet, wherein the first driving magnet is arranged to correspond to the coil in a first direction; and
a second driving magnet, wherein the second driving magnet is arranged to correspond to the coil in a second direction which is different from the first direction.

6. An electronic device, comprising:
a driving assembly as claimed in claim 1;
a lens assembly positioned on the movable member of the driving assembly; and
an optical sensor configured to receive light that passes through the lens assembly.

7. The driving assembly as claimed in claim 1, wherein a channel penetrates the movable member along the main axis.

8. The driving assembly as claimed in claim 1, wherein the coil is positioned between the focusing magnetic element and the driving magnet unit.

9. The driving assembly as claimed in claim 1, wherein the magnetic force for inhibiting the resonance of the movable member is generated even when the focusing magnetic element and the driving magnet unit stay still.

10. A driving assembly, comprising:
a fixed member;
a movable member arranged to be movable in a main axis relative to the fixed member;
a driving magnet unit, having a permanent magnet;
a coil, wherein the movable member is driven to move in the main axis by a magnetic force generated by the coil and the driving magnet unit;
a focusing magnetic element, made of a magnetic material, not a permanent magnet, and corresponding to the driving magnet unit, wherein the resonance of the movable member is inhibited by a magnetic force generated by the focusing magnetic element and the driving magnet unit;
a positioning magnet, wherein the positioning magnet, the coil, and the focusing magnetic element are positioned at the movable member; and
a hall sensor, wherein the hall sensor and the driving magnet unit are positioned at the fixed member, and the positioning magnet is arranged to correspond to the hall sensor.

11. The driving assembly as claimed in claim 10, further comprising another focusing magnetic element and another positioning magnet, wherein the two focusing magnetic elements are diagonally positioned at the movable member, and the two positioning magnets are diagonally positioned at the movable member.

12. An electromagnetic driving module, comprising:
a driving assembly, comprising:
a fixed member;
a movable member arranged to be movable in a main axis relative to the fixed member;
a driving magnet unit, having a permanent magnet;
a coil, wherein the movable member is driven to move in the main axis by a magnetic force generated by the coil and the driving magnet unit; and
a focusing magnetic element, made of a magnetic material, not a permanent magnet, and corresponding to the driving magnet unit, wherein the resonance of the movable member is inhibited by a magnetic force generated by the focusing magnetic element and the driving magnet unit;
a base assembly;
an OIS (optical image stabilization) driving magnet;
an OIS driving coil, wherein the movable member is driven to move in a direction perpendicular to the main axis by a magnetic force generated by the OIS driving coil and the OIS driving magnet; and
an OIS magnetic element, wherein the resonance of the driving assembly is inhibited by a magnetic force generated by the OIS magnetic element and the OIS driving magnet unit.

* * * * *